Oct. 21, 1969    A. MIKKELSEN    3,473,443

SAFETY VALVE FOR HYDRAULIC SYSTEM

Filed March 27, 1967

United States Patent Office 3,473,443
Patented Oct. 21, 1969

3,473,443
SAFETY VALVE FOR HYDRAULIC SYSTEM
Arne Mikkelsen, Mimersvaenge, Denmark, assignor to Danfoss A/S, Nordborg, Denmark, a company of Denmark
Filed Mar. 27, 1967, Ser. No. 626,020
Claims priority, application Germany, Mar. 26, 1966, D 49,708
Int. Cl. F15b 11/10, 13/042; F16k 15/04
U.S. Cl. 91—437                                7 Claims

ABSTRACT OF THE DISCLOSURE

A safety valve for a hydraulic system, for example a hydraulic steering system of a car, comprises a valve body defining a valve chamber and a valve seat and a spring biased valve member seating on the valve seat. The valve body has at least two channels which open into the valve seat adjacent one another and are connected respectively to locations where overpressure can occur in the hydraulic system, for example at opposite sides of a reversible hydraulic motor. Overpressure at one or another of these locations unseats the valve member to provide communication between the locations and also communication with a fluid discharge to relieve the overpressure.

---

Figure 1:
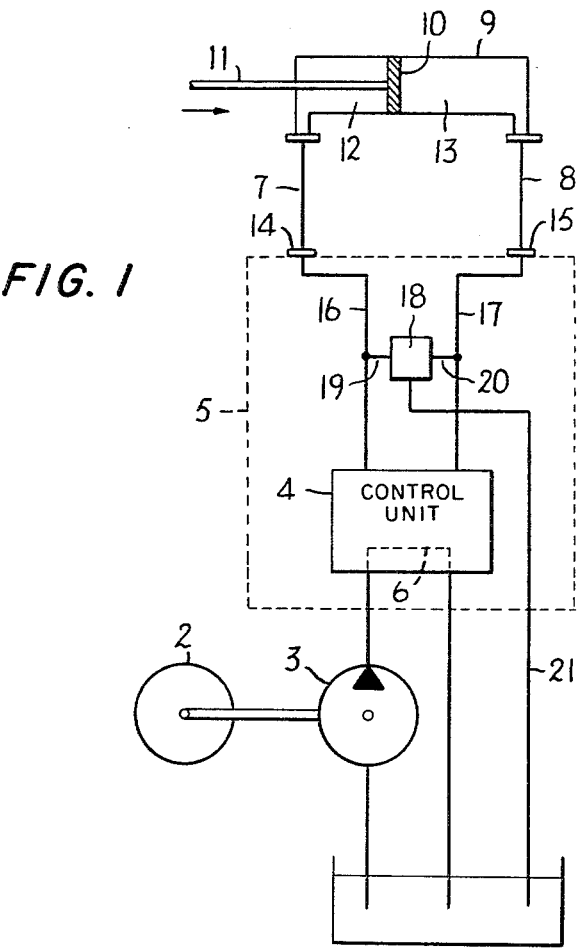

The invention relates to the protection of a hydraulic system against overpressure by a safety valve in which the overpressure unseats a spring biased valve member. In many hydraulic systems overpressure can occur at different locations. It has hence been necessary to provide a safety valve at each of the locations where overpressure can occur.

In hydraulic systems it is frequently not sufficient merely to discharge fluid from a location of overpressure to a fluid reservoir. Frequently an overpressure in one location leads to an underpressure in another which can be relieved only by supplying fluid to the location of underpressure. In order to use fluid from a location of overpressure—or part of it—to supply fluid to a location of underpressure, it is necessary to provide hydraulic cross-connections which likewise must be protected by valves. The expense of providing such protection becomes quite high.

A typical example of a hydraulic system in which the above mentioned disadvantages occur is a hydraulic steering system in which the wheels of a vehicle are steered by means of a reversible hydraulic motor consisting of a cylinder and piston under control of a hydraulic control system. When the wheels are subjected to an excessive force, for example when they engage a curb or other obstacle, an overpressure occurs on one side of the piston of the hydraulic steering system, while on the other side there is a corresponding underpressure. The resulting pressure difference may exceed values which are permissible for the control system.

It is an object of the present invention to overcome the aforementioned disadvantages in a simple, yet effective, manner.

In accordance with the invention at least two channels open into the valve seat of a safety valve in such manner that a valve member normally closing the channels is unseated by overpressure in one or both of the channels.

With this construction, only one safety valve is required for protection of two or more locations where overpressure can occur in a hydraulic system. Moreover, a single spring is sufficient for pressing the valve member on a seat so that the same pressure relationship prevails with respect to all of the points that are to be protected.

Moreover, when the valve member is unseated, the channel subjected to overpressure is not only opened to an overpressure discharge, but simultaneously is connected with an adjacent channel so that if an underpressure prevails in the latter channel, the fluid from the channel subjected to overpressure can flow to the other channel to relieve the underpressure. In this connection it will be noted that the safety valve is not undirectional. It hence does not matter in which channel overpressure and in which channel underpressure occurs. As all of the channels lead to a common place, they can likewise serve as underpressure or replenishing channels.

The safety valve in accordance with the invention thus materially simplifies the construction of safety connections of a hydraulic system.

In a preferred embodiment, the safety valve is in the form of a ball valve with at least two channels opening adjacent one another in the spherical ball seat. Such a ball valve can be produced at low cost in spite of great accuracy. In particular the spherical shaped valve member cannot become canted or locked when—as is necessary—the overpressure is not exerted in an axial direction.

Preferably the channels are arranged symmetrically with respect to one another, and are approximately radial to the spherical ball seat. This arrangement assures that all of the danger points connected to the respective channels are relieved at the same overpressure. The radial arrangement of the channels results in minimum port surfaces with correspondingly good closure. It will be understood that the openings of the channels should be as close as possible to the center of the spherical valve seat, because on the one hand this contributes to a maximum sealing force and on the other hand provides the maximum component of the overpressure in the direction of the spring force.

In a preferred example of the invention, two overpressure channels of the safety valve are connected with the hydraulic control lines of a reversible hydraulic motor, in particular in a hydrostatic steering system. Moreover, the side of the valve chamber opposite the valve seat is provided with a line leading to the fluid reservoir of the hydraulic system. In an application of this kind, the advantages of the invention are particularly significant. The safety valve simultaneously protects both control lines against overpressure. The excess fluid from a control line subjected to overpressure can be discharged to the fluid reservoir or can be conducted wholly or in part to the other control line to relieve underpressure.

The exact position of the safety valve in the hydraulic system is of subordinate importance. However, it is particularly advantages to arrange the control valve in the housing of the hydraulic control unit between the control lines or channels in the housing leading to the control lines. Space can always be found in the housing for a single small valve. The channels in the housing leading to the safety valve are advantageously short.

Figure 2:
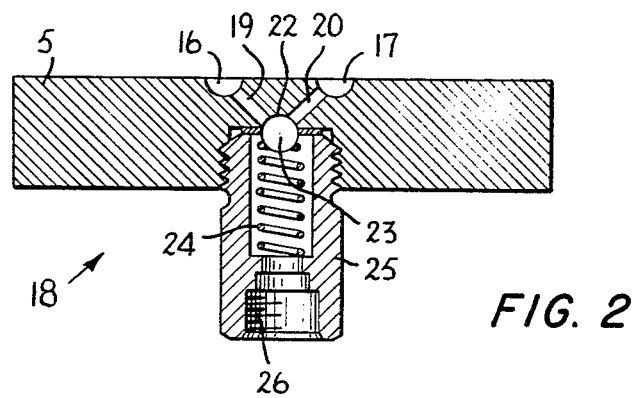

The invention will be more fully understood from the following description of a preferred embodiment shown by way of example in the accompanying drawings in which:

FIG. 1 is a circuit diagram of a hydraulic steering system, including a safety valve inaccordance with the invention, and FIG. 2 is a sectional view of an embodiment of the safety valve.

A hydrostatic or hydraulic steering system shown by way of example in FIG. 1 comprises an oil reservoir 1 from which oil is drawn by a pump 3 driven by a motor 2 and supplied under pressure to a control unit 4, the housing 5 of which is indicated in broken lines. Such a control unit is described, for example in United States Patent 2,984,215. The control unit is provided with a steering wheel. If the position of the wheels which are to be steered corresponds with the position of the steering wheel, the pressure oil flows back to the oil reservoir 1 through a short circuit path 6. If the position of the wheels to be steered does not correspond to the position of the steering wheel, oil pressure is supplied over one or the other of hydraulic control lines 7 and 8 to the cylinder 9 of a hydraulic motor, the piston 10 of which is connected by a piston rod 11 with the wheels to be steered.

If, for example the control line 7 is underpressure so as to supply pressure fluid to the cylinder space 12 on one side of the piston 10, the piston moves toward the right and oil flows from the cylinder space 13 on the other side of the piston through control line 8 and the control unit 4 back to the reservoir 1. A similar relation prevails when oil pressure is supplied through the control line 8 and discharged through line 7.

The two control lines 7 and 8 are connected by connectors 14 and 15 with channels 16 and 17 in the housing 5 of the control unit 4. A safety valve in accordance with the invention is arranged between these channels and is connected with the channels 16 and 17 by two short channels 19 and 20 respectively. A discharge line 21 leads from the safety valve to the oil reservoir 1.

By way of example, an overpressure occurs in the control line 8 when a disturbing force in the direction of the arrow acts on piston rod 11. The piston 10 thus acts as a pressure member. As soon as a predetermined overpressure is reached in line 8, the safety valve opens and allows excess oil to flow from the space 13 on the high-pressure side of the piston. The excess oil can serve on the one hand to fill the space 12 on the other side of the piston and on the other hand can discharge through the line 21. The amount of oil flowing from one side of the piston to the other is not always the same and depends inter alia on the small but not negligible compressibility of the oil.

In FIG. 2 there is shown in section an exemplary embodiment of the safety valve 18. In this embodiment the safety valve and the connecting channels leading to it are incorporated in a portion of the housing 5 of the hydraulic control unit 4. The connecting channels 19 and 20 leading to the safety valve branch off from channels 16 and 17 formed between the portion of housing shown in FIG. 2 and a mating portion (not shown). The channels 19 and 20 open into a spherical valve seat 22 formed in the housing 5. A spherical ball valve member 23 seats in the spherical valve seat 22 and conforms in curvature to the seat. The ball 23 is pressed or biased against the seat by a helical spring 24, the tension of which is adjustable by a threaded hollow nipple 25 which screws into an internally threaded recess in the housing 5. The space inside the nipple 25 in which the spring 24 and ball 23 are disposed, is connected by a threaded connection 26 with the discharge line 21 leading to the oil reservoir 1 as seen in FIG. 1. The two channels 19 and 20 open adjacent one another near the bottom of the spherical valve seat 22 and are arranged symmetrically with respect to the axis of the spring 24 and hence with respect to the line of direction of pressure exerted by the spring 34 to press the ball 23 toward the valve seat 22. The connecting channels 19 and 20 are preferably disposed approximately radial to the valve seat as shown in FIG. 2.

As seen in FIG. 1, channels 16 and 17 lead from the control unit 4 to control lines 7 and 8 connected with opposite ends of the cylinder 9 of the reversible hydraulic motor so as to communicate respectively with spaces 12 and 13 on opposite sides of the piston 10.

Normally, the ball 23 (FIG. 2) of the safety valve is pressed against the spherical valve seat 22 by the spring 23 wtih such force that both of the channels 19 and 20 are closed. However, if an overpressure occurs for example in channel 17, it is transmitted by the connecting channel 20 to the safety valve and lifts the ball 23 somewhat off its seat. Excess oil from the channel 20 can then flow directly to the channel 19 if an underpressure prevails there, or can flow through the nipple 25 and discharge line 21 to the oil reservoir 1. The safety valve operates in like manner if an overpressure occurs in channel 16. Since there is but a single spring, and since the channels 19 and 20 are symmetrically disposed with respect to the spring axis, the safety valve is responsive to the same overpressure whether it occurs in channel 16 or in channel 17. By adjustment of the pressure exerted by spring 24, the critical value of overpressure in both of channels 16 and 17 is simultaneously and equally adjusted. If, on the other hand, it is desired to provide for actuation of the valve by different values of overpressure in the respective lines, this is accomplished by locating the channels 16 and 17 asymmetrically.

With the construction shown by way of example in FIGS. 1 and 2, a single safety valve 18 serves functions which would require four conventional undirectional safety valves. Thus the valve 18 provides communication from the channel 16 to channel 17 in the event of overpressure in channel 16, provides communication from channel 17 to channel 16 in the event of overpressure in channel 17 and provides for relief of each of channels 16 and 17 through the discharge line 21 leading to the oil reservoir 1. While only two connection channels 19 and 20 have been shown by way of example in FIG. 2, it will be recognized that additional channels can be provided if desired. For example, another pair of channels can be disposed in a plane perpendicular to that defined by the axis of channels 19 and 20. With the addition of other channels opening into the valve seat, the number of functions performed by the single safety valve is further increased.

What is claimed is:

1. In a hydraulic system having a plurality of locations where overpressure can occur and a fluid discharge, a safety valve comprising a valve body defining a chamber and a valve seat, a valve member disposed in said chamber and seating on said seat and means for biasing said valve member toward said seat, said valve body having at least two channels opening in said valve seat adjacent one another, means connecting said channels respectively to locations where overpressure can occur in said hydraulic system and means connecting said chamber with said fluid discharge, whereby overpressure at either of said locations is transmitted through the respective one of said channels to unseat said valve member and permit release of fluid pressure to said other channel and to said fluid discharge.

2. A hydraulic system according to claim 1, in which said valve member and valve seat are spherical and said channels are substantially radial to the valve seat.

3. A hydraulic system according to claim 2, in which said biasing means is a spring pressing said valve member in a line of a direction toward said seat, and in which said channels open in said valve seat as ports which are symmetrically disposed with reference to the point of intersection of said line of direction of spring pressure with said seat.

4. A hydraulic system according to claim 1, including a reversible hydraulic motor having opposite inlet-outlet ports and control means for supplying fluid pressure to either one of said ports while discharging it through the other, said channels of said safety valve being connected respectively with said inlet-outlet ports of said motor.

5. A hydraulic system according to claim 4, in which said motor comprises a hydraulic cylinder and a piston reciprocable in said cylinder, said ports opening into said cylinder on opposite sides of said piston.

6. A safety valve for a hydraulic system, said valve comprising a valve body having a spherical valve seat and a valve chamber, a spherical valve member disposed in said chamber and seating on said seat, and spring means pressing said valve member in a direction toward said seat, said valve body having at least two channels opening in said valve seat adjacent one another, means for connecting said channels respectively with locations where overpressure can occur in said system, means for connecting said valve chamber to a fluid discharge, and said channels being radial with respect to said valve seat and angularly disposed with reference to one another.

7. A safety valve according to claim 6, in which said channels open in said valve seat as ports disposed symmetrically with respect to the line of direction of pressure of said spring means.

References Cited

UNITED STATES PATENTS 2,416,097  2/1947  Hansen et al. _____ 91—437
2,986,123  5/1961  Augustin _____ 91—437
3,164,959  1/1965  Gondek _____ 91—451

FOREIGN PATENTS 16,255  12/1955  Germany.

PAUL E. MASLOUSKY, Primary Examiner

U.S. Cl. X.R.

91—451; 137—539, 625.69